(12) United States Patent
Smyros et al.

(10) Patent No.: US 9,727,619 B1
(45) Date of Patent: Aug. 8, 2017

(54) AUTOMATED SEARCH

(71) Applicant: INTELLIGENT LANGUAGE, LLC, Richardson, TX (US)

(72) Inventors: Athena Ann Smyros, Richardson, TX (US); Constantine John Smyros, Richardson, TX (US)

(73) Assignee: Intelligent Language, LLC, Richardson, TX (US)

( * ) Notice: Subject to any disclaimer, the term of this patent is extended or adjusted under 35 U.S.C. 154(b) by 0 days.

(21) Appl. No.: 14/268,983

(22) Filed: May 2, 2014

Related U.S. Application Data

(60) Provisional application No. 61/818,908, filed on May 2, 2013.

(51) Int. Cl.
*G06F 17/27* (2006.01)
*G06F 17/30* (2006.01)

(52) U.S. Cl.
CPC ................ *G06F 17/3053* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ............................ 704/1, 9, 10; 707/706–711
See application file for complete search history.

(56) References Cited

U.S. PATENT DOCUMENTS

| | | | |
|---|---|---|---|
| 6,112,201 A * | 8/2000 | Wical | G06F 17/30572 |
| 6,243,670 B1 * | 6/2001 | Bessho | G06F 17/2785 704/9 |
| 6,353,827 B1 * | 3/2002 | Davies | G06F 17/30616 707/769 |
| 6,510,406 B1 * | 1/2003 | Marchisio | G06F 17/2715 704/9 |
| 6,519,585 B1 * | 2/2003 | Kohli | G06F 17/30643 |
| 6,549,897 B1 * | 4/2003 | Katariya et al. | |
| 6,574,622 B1 * | 6/2003 | Miyauchi | G06F 17/3061 |
| 6,937,975 B1 * | 8/2005 | Elworthy | G06F 17/2785 704/9 |
| 7,496,567 B1 * | 2/2009 | Steichen | G06F 17/30707 |
| 7,630,992 B2 * | 12/2009 | Martin | G06F 17/30613 |
| 7,664,631 B2 * | 2/2010 | Sugihara | G06F 17/279 434/185 |
| 8,255,401 B2 * | 8/2012 | Clarkson | G06F 17/16 707/737 |
| 9,201,876 B1 * | 12/2015 | Kumar | G06F 17/30 |
| 2002/0049752 A1 * | 4/2002 | Bowman et al. | 707/3 |
| 2002/0156763 A1 * | 10/2002 | Marchisio | G06F 17/241 |
| 2003/0200192 A1 * | 10/2003 | Bell | G06F 17/3087 |
| 2003/0233224 A1 * | 12/2003 | Marchisio | G06F 17/271 704/4 |
| 2004/0064438 A1 * | 4/2004 | Kostoff | G06F 17/30705 |
| 2004/0194141 A1 * | 9/2004 | Sanders | 725/53 |
| 2004/0267731 A1 * | 12/2004 | Gino Monier et al. | 707/3 |

(Continued)

*Primary Examiner* — Lamont Spooner
(74) *Attorney, Agent, or Firm* — Slater Matsil, LLP

(57) ABSTRACT

Embodiments described herein are used to automatically generate a list of searchable terms from any text set, as text found in a repository of information, that then can be used in a variety of applications, from providing search results, to analyzing data sets, to building a variety of text generation tools, such as messaging and emails.

20 Claims, 2 Drawing Sheets

(56) References Cited

U.S. PATENT DOCUMENTS

| | | | | |
|---|---|---|---|---|
| 2005/0149494 | A1* | 7/2005 | Lindh | G06F 17/30607 |
| 2005/0267871 | A1* | 12/2005 | Marchisio | G06F 17/30672 |
| 2006/0259475 | A1* | 11/2006 | Dehlinger | G06F 17/30997 |
| 2007/0010990 | A1* | 1/2007 | Woo | G06F 17/271 704/4 |
| 2007/0011151 | A1* | 1/2007 | Hagar et al. | 707/4 |
| 2007/0156669 | A1* | 7/2007 | Marchisio | G06F 17/30731 |
| 2008/0021860 | A1* | 1/2008 | Wiegering | G06F 17/30864 |
| 2008/0065597 | A1* | 3/2008 | Vedula | 707/3 |
| 2008/0126297 | A1* | 5/2008 | Rowley | 707/2 |
| 2008/0126311 | A1* | 5/2008 | Rowley | 707/3 |
| 2008/0235208 | A1* | 9/2008 | Rouhani-Kalleh | G06F 17/30864 |
| 2009/0043824 | A1* | 2/2009 | Claghorn | G06F 17/30011 |
| 2009/0319257 | A1* | 12/2009 | Blume | G06F 17/278 704/7 |
| 2010/0042588 | A1* | 2/2010 | Smyros | G06F 17/30613 707/706 |
| 2010/0042589 | A1* | 2/2010 | Smyros | G06F 17/30616 707/710 |
| 2010/0042590 | A1* | 2/2010 | Smyros | G06F 17/30616 707/706 |
| 2010/0042602 | A1* | 2/2010 | Smyros | G06F 17/30091 707/711 |
| 2010/0042603 | A1* | 2/2010 | Smyros | G06F 17/30675 707/711 |
| 2010/0100543 | A1* | 4/2010 | Brady | G06F 17/30613 707/732 |
| 2010/0185716 | A1* | 7/2010 | Nakamura | G06F 17/16 708/650 |
| 2010/0287162 | A1* | 11/2010 | Shirwadkar | G06F 17/2785 707/740 |
| 2011/0093257 | A1* | 4/2011 | Shpigel | G06F 17/271 704/9 |
| 2011/0258173 | A1* | 10/2011 | Ratiner | G06F 17/30637 707/706 |
| 2012/0109651 | A1* | 5/2012 | Chen | G06F 17/30616 704/240 |
| 2012/0290290 | A1* | 11/2012 | Tur | G10L 15/26 704/9 |
| 2013/0013612 | A1* | 1/2013 | Fittges | G06F 17/30707 707/739 |
| 2013/0304469 | A1* | 11/2013 | Kamada | G06F 17/30864 704/239 |
| 2014/0095505 | A1* | 4/2014 | Blanchflower et al. | 707/737 |
| 2015/0243276 | A1* | 8/2015 | Cooper | G06F 17/30787 704/251 |

* cited by examiner

AUTOMATED SEARCH

RELATED APPLICATIONS

This application claims priority from Provisional Application No. 61/818,908, "DOCUMENT RECONSTRUCTION, TEXT EXTRACTION, AND AUTOMATED SEARCH", filed 2 May 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

The embodiments described herein are used to automatically generate a list of searchable terms from any text set, as text found in a repository of information, that then can be used in a variety of applications, from providing search results, to analyzing data sets, to building a variety of text generation tools, such as messaging and emails. Many times, a document represents what the user is looking for. It may be a resume compared against job descriptions, it may be a requirements document for a component compared against vendor component description documents, or it may be any kind of a control set that needs to be compared against any other text set. The output of the process is a resultant list of terms that can be used for any number of purposes, such as search and information retrieval, data analysis, and for automating such retrieval and analysis, as well as a variety of communications between the system and users.

Figure 1:
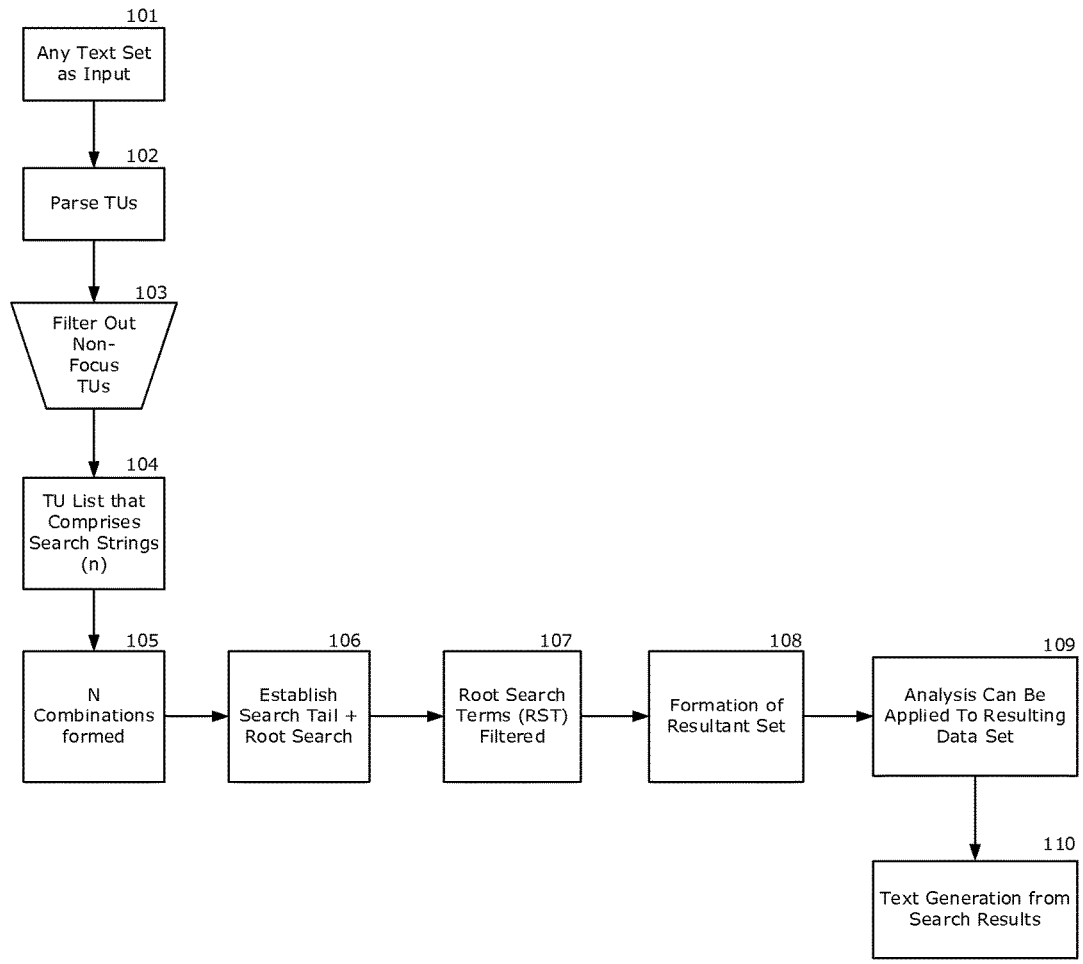
FIG. 1 illustrates an example of a flowchart that is usable with the embodiments described herein.

FIG. 1 shows a flowchart that is suitable for use with the invention. It starts by the system receiving a text set 101 that may represent a message, a document, an email, a file, or may represent a subset of such text. There may be multiple files that are represented by the input text set. The delivery of the text set may be a human or requesting function or it may also be triggered when a system- or repository-level has been notified of a new email or a updated document. The delivery of the input may be using any communication means, such as over a wireline network, wireless network, or may be the result of a change in memory for an embedded device, handheld device, robot, etc. This process, depending on the need for user interaction, may be completely automated or may require that an input is used, such as a requirements document. This serves as the control point for building the searchable terms that are used to compare against another set of documents, files, emails, or messages. Any number of text sets can be automated using this process. Note that the input may have been in a non-text form that has been converted to text for use with the embodiments described herein.

The input that contains the text set then needs to be parsed to locate term units (TUs) 102; an example of this is shown in "SYSTEMS AND METHODS FOR INDEXING INFORMATION FOR A SEARCH ENGINE," U.S. Pat. No. 7,882,143 issued 1 Feb. 2011, the disclosure of which is hereby incorporated herein by reference in its entirety, which initially takes the text set and determines the set of TU delimiters that exist for the underlying language or languages of the text set. The TU delimiter is similar to, but not necessary a word delimiter for a given language. TUs are based on characters that map to a specific set of functions within a language, such as words, symbols, punctuation, etc. For instance, in one embodiment, English uses the space as a delimiter for words, but it is insufficient to determine the entire functional usage of each character within the input, such as a sentence stop like a period or question mark. Therefore, it is recommended that a TU splitter should be used so that the ability to derive the searchable terms can include symbols and other such characters that have a specific meaning within the language or languages being used in the inputs. In most implementations, the duplicates from the TU list can be removed, unless frequency or other statistical analysis is to be performed at this point.

Once the set of TUs are found for the text set that serves as the input, then the filter process 103 can be used to remove any number of TUs by using the focus TU as the filter. A focus TU may be defined using any kind of criteria, such as a grammatical part of speech (POS), a functional descriptor, or any characteristic that is required for a specific application. If there is a criteria that can be expressed as a single TU and can be distinguished from other criteria, then it can be used as a focus TU. The focus TU may be described as a verb, whereby any TU not equal to a verb is filtered out. If a functional descriptor is used, it may be used when it is supported by the underlying data format, such as requiring that only modifiers be used. This is common when sentiment and other such measurements are used since they generally modify an object of interest, such as "this product is good" (good=modifier) or "it is a bad product" (bad=modifier). A less grammatical focus TU can be set, such as a term like "US dollar" or "$". In addition, the use of the focus TU is constrained by the underlying system and the amount of grammar analysis that is available to the system at the time of determining the focus object, and may also be constrained by the requirements for a particular request. An implementation may support any number of focus TU criteria. This process is also called term extraction, where the terms of a document, including single words and multiple words that are linked via grammar, such as "good quality widget" and "food stylist for southern magazine". In some cases, a set of terms that form a phrase, such as a group of modifiers with an object, are an improvement over other types of extractions based on statistics or prior knowledge about the subject. Using a grammatical filter, these problems can be reduced or eliminated and all or most such multi-word terms can be located and added to a search. In addition, combinatorial analysis can be done so that comparisons against different multi-word terms, such as "Siberian husky" and "Siberian husky sled dog team", can be related in a variety of ways by recognizing that "Siberian husky" is a subset of "Siberian husky sled dog team".

Note that any number of filters can be run based a focus TU, such as allowing or disallowing terms that are synonyms of the focus TU. This can also be extended to include acronyms and other substitutions, as well as associations (Dallas, Big D, DFW, and North Texas). This is another way of forming exact and flexible based searches, where substitutions and associations are allowed when building the searchable terms that are considered similar to one another. If they are required to be exact, then the exact terms are used. Another feature of this filtering is that multiple focus TUs can be used and ranked based on some kind of criteria, such as frequency, positive mentions (this may require sentiment analysis or other separate processes), or user-defined terms. These may be found within a document, or determined using a multi-word term extraction feature that shows all or most variations of expressions of the same multi-word term, such as "free shipping" and "shipping is free" by using different equivalent grammar features. These criteria can be assigned based on a grammatical weight analyzed by the input or may be supplied by a user, depending on the requirements of an implementation. For instance, a user may need to specify that he is looking for a product that is less than 3 years old since this is an arbitrary choice on the part of the user in many cases.

Another filter may be a topical filter, whereby the topics found in another text set are used to form the basis for the searchable terms. This topic filter may be used separately or in conjunction with the above filter. This text set may be one or more documents that contain at least one topic. The topical analysis should be able to detect both single-word topics and multiple-word topics. The topical analysis may be done by manual or computer processes, and the output of this process should be a list of topics that comprise the filter that is used, in place of the TU filter or may be used in conjunction with the TU filter terms, which is a general list of terms. The choice of the filter type is based on the implementation requirements; in some cases, the topics can be used to weight terms that have more importance in a range of documents versus other cases, which may not require the terms to be filtered against a topic list. This filtering results in a grouping of searchable terms based on topics and can be used to separate and weight members of the group as required by an implementation.

Only the terms that pass the used filters for an implementation are used as the raw material for the search strings 104. A search string is defined as one or more TUs that are arranged in various grammatical orders as required by a specific language. This may be dependent on the focus TU when the focus TU is grammatical in nature, such as when a verb is filtered out. In some implementations, the main verb may be used (such as with perfect and progressive tenses in English) that contain the meaning of the verb, such as "is playing", where "playing" is used as the basis for perhaps looking at the stems that are available in the language. Most languages have inflections for verbs based on tenses, and either the suffix from a root is added or another word or set of words are used to indicate tense, mood, and other such characteristics of verbs. The same type of analysis may be used for establishing any type of filter from the POS or other listing to the grammatical function of a TU within a sentence of the text set that is used to build the focus TU list.

For instance, a text set comes in regularly, such as a requirements document or a system status email, and the text needs to be analyzed for searchable terms and then is searched against other text sets that are found in a searchable location, such as a repository or another device's memory or hard drive, etc. It may be that this is a marketing department that needs to keep track of a new product that has just been launched to the market. It may follow a review site that contains autonomous reviews. The marketing department may be looking for a generic set of text that indicate how the product has been received, and then would use a noun group filter that filters out all or most terms that are not nouns or that modify nouns to form a noun phrase or clause. There is no requirement that an implementation needs to process a single type of characteristic; a compound filter can be built that filters out different parts of the text set for any number of characteristics that are required. Another implementation may require a compound filter that is set to the product name when it is equal to a noun and allows all or most modifiers that can be used to form noun groups. Thus, the product name is used to build the search strings that are found in each document that relate to the product name, including their modifiers. In turn, this is used to automatically search other documents, messages, emails, etc. to see how the product is being received and what is considered important to customers.

The TU list that forms the search strings are required to be grouped into a set of combinations 105 that are based on the underlying grammatical rules of a language, such as English. The number of combinations (N) is not known at runtime in most instances. This type of grouping is affected by the filter definition, since some filters have specific TUs that do not have a need for combinatorial analysis, such as when a product name is used as the search term. However, the majority of implementations will have generic requirements, such as looking for POS (e.g., verb) or functional descriptors (e.g., modifier). When this happens, the set of combinations cannot be known in advance; therefore the system includes both the use of the terms that pass the filter as a single term or as a multiple term. This is done by analyzing the underlying grammar and is based on the type of system being used. In this way, the number of possible combinations can be established. For instance, in a given system a simple grammar model using POS is employed to determine the roles of terms within an input. This underlying grammar indicates that the term "dog" has passed the noun group filter, but may have uses as a verb. If the filter works by looking at the POS of "dog", this would not be distinguished. If the use of the functional descriptor "modifier" or "noun phrase" were used, then only the uses within the document that relate to "dog" would be used to construct the possible N combinations possible with "dog" within the document. This might include "a dog", "dog house", "dog bone", "a big furry dog", "a black and white furred, blue-eyed, bushy tail, and pointed eared snow dog", and "little dog" and other such uses within a document that contain dog being functionally used as a member of a noun group, even if it is not necessarily being used directly as the POS (noun). The actual strings are not necessarily unique, as it is possible that another RST may equal "house" or "bone".

The combinations are therefore constrained by grammatical function within the input text set and therefore offer the most flexibility in constructing the largest number of possible searchable terms. If a topical filter were used in this hypothetical system, then different contexts of "dog" could be grouped together and the N number for each combination would be adjusted according to such contextual grouping. Other techniques may be used to refine the process. For instance, it is possible to ascertain the relation between two terms, such as "dog" and "bone" above, to determine if there is a similarity between the two that would indicate another grouping exists, leading to the addition of combinations. In this case, dog and bone are not synonyms and are not grouped together and therefore no change in the number of combinations exists. However, it may be possible to link "little canine" and "little dog" as canine is usually considered, in most implementations, to be related to dog. In this case, the number of combinations would be reduced.

Once the combination of possible searchable terms has been extracted from a text set, then the root searchable term (RST) and search tails 106 should be established. In some cases, when a focus object contains a specific term, such as dog, the root searchable term is identifiable based on length. However, when a generic noun group is used as the filter, then the number of possible combinations require more analysis for establishing a set of searchable terms. For instance, in a sample document there are several different TUs that were combined in various ways using the noun group filter. If the TU List is equal to: "floor", "marble", "ceramic", "tile", "parquet", "wood", "slate", the various ways in which the TUs that can be combined in N ways is examined next. If the N ways the terms are used in the document are ""marble floor", ceramic tile", "floors", "parquet wood", "parquet floor". For this list, there is only one single use of "floor" and no other terms are used in this manner. Assuming that "wood", "floor", and "tile" are nouns, the RST can be equal to those terms for a specific implementation. In some cases, the RST may also be tuned for usage within the document, meaning that only "floor(s)" is used as a single-term RST. When it comes to the combinations, the variety expressed in the document can be used to form the RST that has a length greater than one, such as "parquet wood" and "parquet floor", which have a common modifier. They would be in two different RSTs assuming that wood and floor are not considered similar in the example system. A comparison based on the noun, such as "parquet floor" and "marble floor", which have a common noun. Several techniques can be employed to determine if there is an RST that exists and its associated search tails (ie, very long sets of modifiers that have the same RST) that are more limiting in scope, such as if the input contain "blue and white ceramic tile" as well as "ceramic tile". A simple reduction in the number of modifiers to a constant occurrence of a modifier can be used to establish that ceramic is part of the RST but "blue and white" is not, making it a search tail.

In addition, the use of flexible search techniques, as shown in SYSTEMS AND METHODS FOR SEARCHING AN INDEX", U.S. application Ser. No. 12/192,834, filed 15 Aug. 2008, the disclosure of which is hereby incorporated herein by reference in its entirety, can be used to limit the amount of insertion and inversion that is grammatically possible so that the searchable terms can be analyzed for the RST, along with other search term tails that are considered related to "ceramic tile", the RST. The search tails can be used, in any combination that is supported by the grammatical analysis to build any number of searchable terms. These expressions can be predicted because insertions and inversions have known patterns in most languages, including English. Moreover, the searchable terms do not therefore form the full range of the possible expressions using an RST that are relatable to the input text set, but are able to use the list to find similar expressions in the other documents that comprise the searchable repository.

The RSTs, along with the search tails, comprise the basic search list that can further refined by the an optional step that filters the RSTs 107 against another list, that is generally external to the input This may be a topic list, a geographical list, a date list, or other such external list to determine if an RST has a different function within a specific repository or set of files, as this for some implementations is an important consideration for determining the context of the searchable terms. Any kind of list may be used to filter against the RST depending on the implementation requirements and how much grammatical analysis is available to the process at a given time. For instance, a list of topics are available that indicate the main points of a text stream like a document, message, or file. The main points may be different from a regular search term. Therefore, these may not be used in the search term list but may indicate the range of contexts based on the topics that exist within a set of searchable terms. This is optional, as sometimes the differentiation between topics and other such quantification measures and regular terms may not be necessary, so no filter based on another list is required. However, when contextualization is required, a filter at this stage can remove geographical information from basic descriptions that are not required for an implementation.

The formation of the resultant set 108 is the sum of the RSTs plus all or most search tails that are possible, as well as the removal of any terms, if required by the implementation. In many cases, various linear orders that can be applied to both the organization of the searchable terms when run against a repository or one or more elements or groups of the repository, as well as the output, by any order possible. An example of this is alphabetical order, which each searchable term is compared against a repository in order. This may be used when a bucket of terms can be used to reduce a repository to a small subset to reduce the amount of computational work that a problem requires, which is a significant problem in dealing with very large-scale repositories. For many implementations, a consideration of the linear order is generally based on some quality of the RST, or the amount of searchable terms that the RST can generate, in addition to the number of searchable terms related to each search tails for a specific input text set. For instance, a search using an RST may be used to compare/contrast its result list against RST search tail terms. When frequency does not exist when a message or short text stream contains a minimum amount of information, the use of scoring mechanism that looks at the RST and search tails of that RST may be useful in learning about the use of the searchable terms within a wider set of documents/files/messages. These results may be added or excluded depending on the implementation. An RST with no searchable terms may be considered to have a different score (higher or lower) based on implementation. In some cases, a search tail, which is more specific, may be the preferred option, and will have a higher weight placed on it instead of a more generic RST, especially when used against a requirements documents where specificity is important.

An optional analysis 109 may be performed on the resulting search results, including saving and observing the changes of the results over time. The individual documents returned by the search provides an input for analysis functions. The ranking of the repository members and other such information about the repository found to be responsive to the searchable terms. Similarity and matching operations may be used to determine how closely the input text set might may other characteristics of other input sets when the automating matching is done on multiple text sets or against a part of whole of the repository. In addition, relations between RSTs found to be grouped in some documents but not in others may be used to perform a variety of data mining operations and other such information gathering and decision-making strategies. Automated searchable terms may be compared to a user-based input search term set to see what is popular and what is not about a specific story, article, or feature set of a specific product. It may also be used by a business to determine if a particular marketing campaign was successful. Also, the automated search results may be examined for other data found in those returns, such as topical uses of the searchable terms and the contexts under which such terms are used.

Text generation 110 is optional using the results to generate text used in a message or email back to the user, or may be used to communicate the results with another device, that in turn, uses the information to control some operation. An example might be that after running an automated search against the feature set product document, a change in which feature set is considered to be the most important is discovered. This could trigger a message of the results so that more targeted advertising could be performed or a job that had gone unfulfilled could be fulfilled because the correct candidate had been found in the automated search term results. Reports might be filed that show the results of the search, including the documents that were found to be related to a requirement, such as in an aircraft repair manual when there are several different parts and the repair reports are compared against the repair manual. The repairs may indicate that a specific part is failing, and this could be added into a message. In addition, a summary of the texts found to be responsive to the automated searchable terms found in an input document may also be made available, and may be displayed in any number of visual fashions, such as in a spectrum which shows what repairs are done the most frequently on a given aircraft.

An example text set 101: "The dog went to the store. He saw a dog bone and a dog house. His owner kept him away from a big furry dog. He then tried to get close to a little dog. Then, he found a mirror and saw a black and white furred, blue-eyed, bushy tail, and pointed eared snow dog.". 102 is assumed to be a simple parse based on a space. The 103 filter is set to verb and functional words. The 104 search strings after the filter equal: dog, store, bone, house, owner, big, furry, little, mirror, black, white, furred, blue-eyed, bushy, tail, pointed, eared, snow. N combinations equal: dog, store, dog bone, dog house, owner, big furry dog, little dog, black white furred blue-eyed bushy tail pointed eared snow dog. 106 RSTs equal: dog, dog store, dog bone, house, owner, mirror. 106 search tails exist only for dog: little dog, big furry dog, little dog, and black white furred, blue-eyed, bushy tail pointed eared snow dog. Optional 107 is not used. The resultant list 108 is searched against a repository starting with the RSTs, then uses search tails along with a flexible search. New information such as "dog marrow bone", and "big furry tan dog" are discovered as part of the flexible search results. These results are scored and ranked based on RST membership (such as dog and little dog being related). Then, an analysis 109 is done to see if big furry dogs with any color fur, based on analysis on the new information using the search insertion results, frequent stores by using resulting documents found as input to the analysis. Last, a text generation message 110 is sent to the pet store indicating the results of that analysis: "big furry dogs of many colors go shopping."

Note that the text may be presented to a user, via a display, or other man-machine interface, or the text may be provided to another program application that uses the returned data as input for further processing. The text may also be converted into a desired format for the user or the program.

Figure 2:
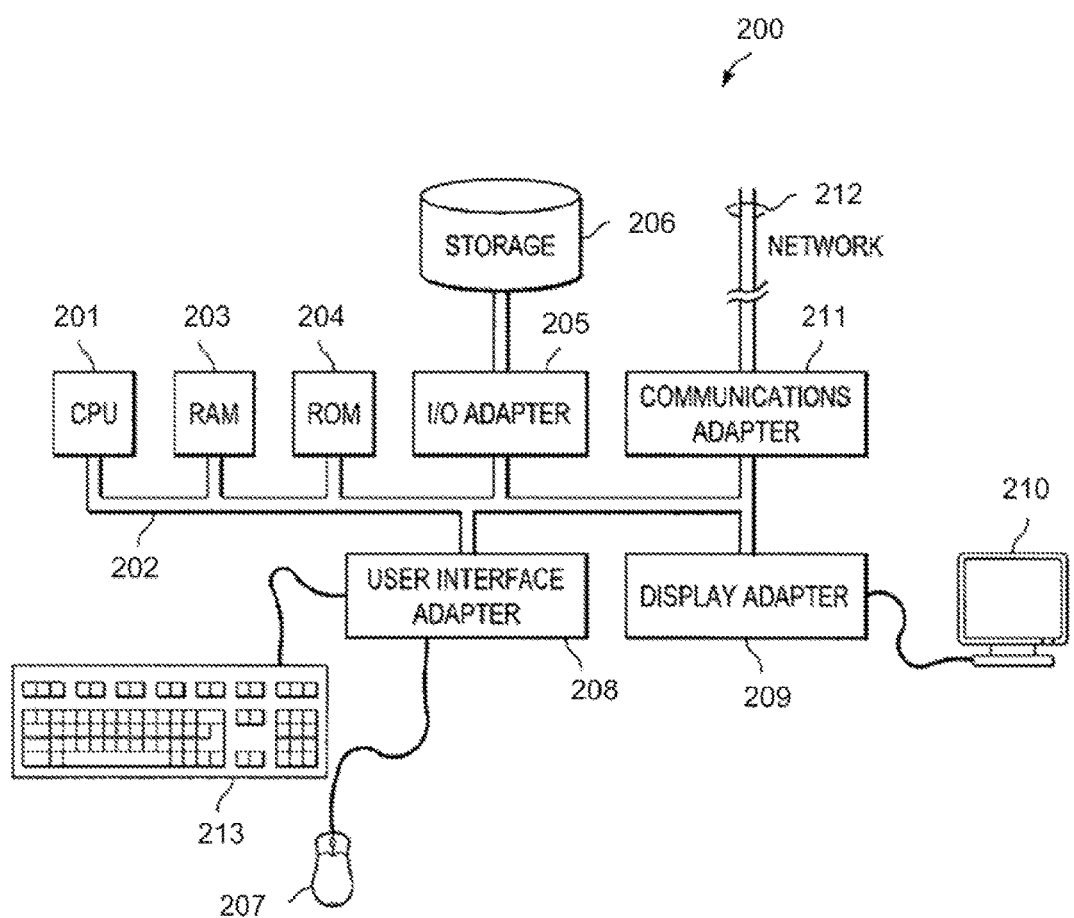
FIG. 2 depicts a block diagram of a computer system which is adapted to use the present invention.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the computer readable mediums include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:
1. A computing device comprising:
one or more processors; and
a non-transitory, computer-readable medium storing programming that is executable by the one or more processors, the programming comprising instructions to:
receive an input data set comprising a document;
determine at least one focus in the input data set, wherein the focus is at least one of a grammatical part of speech or a functional descriptor, and wherein the focus is a portion of the input data set less than the input data set;
form a term unit matrix from the input data set, the term unit matrix comprising a plurality of term units represented as a plurality of numeric integer values, wherein the term unit matrix is a substantially canonical representation of the input data set;

filter the plurality of term units by removing one or more term units from the plurality of term units based on the focus;

for term units that remain after filtering, form a group of remaining term units based on an underlying grammatical rule of the input data set, wherein for each term unit of the group of remaining term units, the underlying grammatical rule is numerically encoded in respective numeric integer values of the remaining term units;

identify at least one root term unit of the group of remaining term units, the at least one root term unit having a plurality of tail term units associated therewith;

search a data repository that is different from the input data set using the at least one root term unit and the plurality of tail term units;

organize search results based on the focus indicating presence of the at least one root term unit; and display the organized search results.

2. The computing device of claim 1, wherein the input data set is a text set comprising at least one portion of at least one message, at least one portion of at least one document, at least one portion of at least one email, at least one portion of at least one file, or combinations thereof.

3. The computing device of claim 1, further comprising programming instructions to determine the focus from the plurality of term units using at least one of a characteristic of the input data set or a user selection.

4. The computing device of claim 1, wherein the computing device comprises at least one of a computer, a laptop computer, a personal computer, a personal data assistant, a camera, a phone, a cell phone, mobile phone, a computer server, a media server, a music player, a game box, a smart phone, a data storage device, a measuring device, a handheld scanner, a scanning device, a barcode reader, a point-of-sale device, a digital assistant, a desk phone, an IP phone, a solid-state memory device, a tablet, or a memory card.

5. The computing device of claim 1, wherein filtering the term units comprises using a topical filter based on a plurality of topics of a data repository.

6. The computing device of claim 1, wherein steps of receiving, determining, parsing, filtering, forming, identifying, searching, organizing, and displaying are performed automatically.

7. The computing device of claim 1, wherein displaying comprises providing organized search results to a human-machine interface or a program application.

8. The computing device of claim 1, wherein the group of remaining term units are constrained by grammatical function within the input data set.

9. The computing device of claim 1, wherein the underlying grammatical rule of the input data set is based on a human language.

10. The computing device of claim 1, wherein search results are organized by at least one of term unit frequency, term unit positive mentions, term unit sentiment analysis, or term unit grammatical weight.

11. A method comprising:

receiving, by a computing device, an input data set comprising a document;

determining, by the computing device, at least one focus in the input data set, wherein the focus is at least one of a grammatical part of speech or a functional descriptor, and the focus is a portion of the input data set less than the input data set;

forming, by the computing device, a term unit matrix from the input data set, the term unit matrix comprising a plurality of numeric integer values, the plurality of numeric integer values corresponding to a plurality of term units of the input data set, wherein the plurality of numeric integer values is a substantially lossless representation of the input data set;

filtering, by the computing device, the plurality of term units by removing one or more term units from the plurality of term units based on the focus;

forming, by the computing device, a group of combinations of term units that remain after filtering and that are based on an underlying grammatical rule of the input data set, wherein for each term unit of the group of combinations of term units, the underlying grammatical rule is numerically encoded in respective numeric integer values of the group of combinations of term units;

identifying, by the computing device, at least one root term unit of the group of combinations of term units that remain after filtering, the at least one root term unit having a plurality of tail term units associated therewith;

searching, by the computing device, a data repository that is different from the input data set using the at least one root term unit and the plurality of tail term units;

organizing, by the computing device, search results based on the focus indicating presence of the at least one root term unit; and providing, by the computing device, the organized search results.

12. The method of claim 11, wherein the input data set is a textual data set comprising at least a portion of at least one human language message, at least a portion of at least one human language document, at least a portion of at least one human language email, at least a portion of at least one file comprising human language text, or combinations thereof.

13. The method of claim 12, wherein the group of combinations of term units that remain after filtering is constrained by grammatical function within the input data set, and the underlying grammatical rule of the input data set is based on a human language.

14. The method of claim 13, wherein search results are organized by at least one of term unit frequency, term unit positive mentions, term unit sentiment analysis, or term unit grammatical weight.

15. The method of claim 11, further comprising determining, by the computing device, the focus from the plurality of term units using at least one of a characteristic of the input data set or a user selection.

16. The method of claim 15, wherein filtering the term units comprises using a topical filter based on a plurality of topics of a data repository.

17. The method of claim 16, wherein steps of receiving, determining, parsing, filtering, forming, identifying, searching, organizing, and providing are performed substantially automatically.

18. The method of claim 11, wherein providing comprises displaying organized search results to a human-machine interface.

19. The method of claim 11, wherein the computing device comprises at least one of a computer, a laptop computer, a personal computer, a personal data assistant, a camera, a phone, a cell phone, mobile phone, a computer server, a media server, a music player, a game box, a smart phone, a data storage device, a measuring device, a handheld scanner, a scanning device, a barcode reader, a point-of-sale device, a digital assistant, a desk phone, an IP phone, a solid-state memory device, a tablet, or a memory card.

20. A method comprising:
- receiving, by a computing device, an input data set comprising human language text;
- determining, by the computing device, a focus of the input data set, wherein the focus is at least one of a grammatical part of speech or a functional descriptor;
- forming, by the computing device, a term unit matrix from the input data set, the term unit matrix comprising a plurality of term units of the input data set, wherein the term unit matrix is represented as a plurality of numeric integer values, and the plurality of numeric integer values is a substantially lossless representation of the input data set;
- filtering, by the computing device, the plurality of term units by removing one or more term units from the plurality of term units based on the focus and by using a topical filter based on a plurality of topics;
- forming, by the computing device, a group of combinations of term units that remain after filtering that are based on an underlying grammatical rule of the input data set, the underlying grammatical rule based on a human language represented in at least a portion of the input data set;
- identifying, by the computing device, at least one root term unit of the group of combinations of term units that remain after filtering, the at least one root term unit having a plurality of associated term units;
- searching, by the computing device, a data repository using the at least one root term unit and the plurality of associated term units;
- organizing, by the computing device, search results based on the focus indicating presence of the at least one root term unit; and
- displaying, by the computing device, the organized search results on a human-machine interface, wherein an ontology of organization comprises a visual spectrum indicating relevance.

* * * * *